United States Patent
Ueyanagi

(10) Patent No.: US 6,943,988 B2
(45) Date of Patent: Sep. 13, 2005

(54) MAGNETIC HEAD HAVING A MAGNETIC RECORDING ELEMENT INCLUDING A PAIR OF CONNECTED YOKE FILMS AND MAGNETIC POLE FILM TO FORM A MAGNETIC GAP

(75) Inventor: Kiichi Ueyanagi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 129 days.

(21) Appl. No.: 10/345,354

(22) Filed: Jan. 16, 2003

(65) Prior Publication Data

US 2003/0137770 A1 Jul. 24, 2003

(30) Foreign Application Priority Data

Jan. 18, 2002 (JP) .......................... 2002-010102

(51) Int. Cl.$^7$ ............................................ G11B 5/147
(52) U.S. Cl. ...................................................... 360/126
(58) Field of Search ......................................... 360/126

(56) References Cited

U.S. PATENT DOCUMENTS 6,275,354 B1 * 8/2001 Huai et al. ................... 360/126
6,339,523 B1 * 1/2002 Santini ........................ 360/317

* cited by examiner

Primary Examiner—A. J. Heinz
(74) Attorney, Agent, or Firm—Oliff & Berridge, PLC

(57) ABSTRACT

A process for producing a magnetic head attaining high speed and high density recording, excellent in reproducibility and relatively inexpensive is provided as well as a magnetic head and a magnetic disk unit. A lower yoke film, an insulating film supporting a thin film coil and an upper yoke film connected at a back end thereof to a back end of the lower yoke film are consecutively piled on a back end surface of a flying slider, and a magnetic pole films and a deposited at a tip end of at least one of the lower yoke film and the upper yoke film, so as to form a magnetic gap. The gap of the surface of the magnetic pole facing a magnetic recording medium is determined by the working pattern of the thin film; therefore, a magnetic pole having a high aspect ratio can be easily produced.

5 Claims, 6 Drawing Sheets

MAGNETIC HEAD HAVING A MAGNETIC RECORDING ELEMENT INCLUDING A PAIR OF CONNECTED YOKE FILMS AND MAGNETIC POLE FILM TO FORM A MAGNETIC GAP

BACKGROUND OF THE INVENTION

1. Field of the Invention

The present invention relates to a process for producing a magnetic head that records information on a magnetic disk with a magnetic field, a magnetic head and a magnetic disk unit, and more particularly, it relates to a magnetic head attaining high speed and high density recording, a magnetic disk unit using the magnetic head and a process for producing a magnetic head that is excellent in reproducibility and is relatively inexpensive.

2. Description of the Related Art

The recording density of hard disk recording units (hard disk drive, commonly abbreviated as HDD) is increasing by 100% per year in recent years, and it is reaching 100 Gb/(inch)$^2$ in an experimental phase. However, due to the superparamagnetic effect and the difficulty in reducing the gap width of the magnetic head, recording density of the conventional HDD is approaching its limitation. As a measure against the superparamagnetic effect, a perpendicular magnetic film or a multilayer structure using an antiferromagnetism film as an underlayer have been developed to obtain a perspective of a density of 300 Gb/(inch)$^2$. Rather, a reduction of the width of the magnetic pole of the magnetic circuit has become a serious problem.

FIGS. 7A to 7E show a conventional typical magnetic head and a magnetic recording transducer used therefor. As shown in FIG. 7A, a magnetic head 1 has a magneto-resistive sensor 3 and a magnetic recording transducer 4 consecutively piled on a back end surface 2a of a flying slider 2, and the head 1 flies above a magnetic recording layer 8a of a magnetic disk 8 by a flying surface 2b having a concave part 2c. The head records information with a magnetic field 49 leaked from the magnetic recording transducer 4, and reproduces information with the magneto-resistive sensor 3.

As shown in FIGS. 7B to 7D, the magnetic recording transducer 4 is formed in the following manner. A lower yoke 41 formed with a soft magnetic film functioning as a magnetic shield film of the magneto-resistive sensor 3, a dielectric film 47 as an insulating film, a thin film magnetic coil 44, and an upper yoke 42 formed with a soft magnetic film and constituting a magnetic circuit by connecting at a back end of the lower yoke 41 through a connecting part 43 are consecutively piled, and a magnetic pole 46' is formed by narrowing the tip end of the upper yoke 42 by etching, so as to form a magnetic gap 48 between the magnetic pole 46' and a magnetic pole 45' at a tip end of the lower yoke 41. Thereafter, the surrounding of the upper yoke 42 is filled with a dielectric film 47'. As a method for forming the magnetic pole 46', there is another method as shown in FIG. 7E, i.e., after attaching a dielectric film 47", a gap for the magnetic pole 46' is formed therein, and the magnetic pole 46' is embedded in the gap. By passing an electric current in the thin film magnetic coil 44 of the magnetic recording transducer 4 thus produced, information is recorded on the magnetic recording film 8a by a leakage magnetic filed 49 from the magnetic poles 45' and 46'.

The length of the magnetic gap 48 between the two magnetic poles 45' and 46' is determined by the thickness of the dielectric film 47, and the width of the magnetic gap 48 is determined by the width of the magnetic pole 46' because the magnetic pole 45' of the lower yoke 41 functioning as a magnetic shield film has a large width. The width of the magnetic gap 48, i.e., the width W of the magnetic pole 46', can be narrowed to 130 nm by etching, and thus the recording density of the magnetic disk can be increased to 100 Gb/(inch)$^2$. Furthermore, even when the width W of the magnetic pole 46' is decreased, magnetic saturation is prevented by increasing the thickness T of the magnetic pole 46'. In order to attain a recording density of 300 Gb/(inch)$^2$, the width W of the magnetic pole 46' should be decreased to 50 to 60 nm.

According to the conventional production process of a magnetic head, however, when the width W of the magnetic pole 46' is decreased to 50 to 60 nm, the thickness T of the magnetic pole 46' is further necessarily increased to prevent magnetic saturation around the magnetic pole 46', but a thick magnetic film is difficult to be subjected to microfabrication and results in poor reproducibility. In the method shown in FIG. 7E, it is difficult to form a gap of 0.1 μm or less in a stable manner, and it is also difficult to embed a metal for the magnetic pole in the gap.

SUMMARY OF THE INVENTION

The invention is to provide a magnetic head attaining high speed and high density recording, a magnetic disk unit using the magnetic head and a process for producing a magnetic head that is excellent in reproducibility and is relatively inexpensive.

In order to solve the problems associated with the conventional art, the invention relates to, as one aspect, a process for producing a magnetic head containing steps of consecutively piling, on a back end surface of a flying slider, a lower yoke film, a thin film coil, an insulating film supporting the thin film coil, and an upper yoke film connected at a back end thereof to a back end of the lower yoke film, and depositing a magnetic pole film at a tip end of at least one of the lower yoke film and the upper yoke film so as to form a magnetic gap.

The shape of the surface of the magnetic pole facing a magnetic recording medium is determined by the working pattern of the thin film, and therefore, a magnetic pole having a high aspect ratio (a ratio of the length in a direction of a recording track and the width in a direction perpendicular to the recording track) can be easily produced.

The invention also relates to, as another aspect, a process for producing a magnetic head containing steps of piling, on a substrate to be a flying slider having a flying surface, a lower yoke film of plural magnetic recording elements arranged one-dimensionally or two-dimensionally, a thin film coil, an insulating film supporting the thin film coil, and an upper yoke film connected at a back end thereof to a back end of the lower yoke film, consecutively; cutting the substrate having the plural magnetic recording elements deposited thereon to form the flying surface, so as to produce a chip bar having the substrate having thereon the plural magnetic recording elements arranged one-dimensionally; depositing a magnetic pole film at a tip end of at least one of the lower yoke film and the upper yoke film of the chip bar exposed on the flying surface, so as to form a magnetic gap; and cutting the chip bar to separate into respective head chips each having the flying slider.

The plural magnetic recording elements are piled on the substrate by one operation, and after depositing the magnetic pole film, the assembly is separated into the respective chips. Therefore, the productivity of the magnetic head is improved.

The invention also relates to, as still another aspect, a magnetic head containing a magnetic recording element on a back end surface of a flying slider, the magnetic recording element containing an insulating film supporting a thin film coil; a pair of yoke films deposited on both sides of the insulating film and connected at back ends thereof; and a magnetic pole film attached to a tip end of at least one of the pair of yoke films, so as to form a magnetic gap.

The shape of the surface of the magnetic pole facing a magnetic recording medium is determined by the working pattern of the thin film, and therefore, a magnetic pole having a high aspect ratio can be easily produced.

The invention also relates to, as a further aspect, a magnetic head containing a magnetic recording element on a back end surface of a flying slider, the magnetic recording element containing a pair of yokes connected at back ends thereof to constitute a magnetic circuit; a coil wound on the magnetic circuit; and a pair of magnetic poles provided at tip ends of the pair of yokes and protruding inside to form a magnetic gap in the magnetic circuit.

The pair of magnetic poles is provided at the tip ends of the pair of yokes as inside protrusions, and thus the magnetic field formed at the magnetic gap is strengthened.

The invention also relates to, as a further aspect, a magnetic head containing a magnetic recording element on a back end surface of a flying slider, the magnetic recording element containing a pair of yokes having a prescribed thickness and a prescribed width and connected at back ends thereof to constitute a magnetic circuit; a coil wound on the magnetic circuit; and a magnetic pole provided at a tip end of at least one of the pair of yokes and having a thickness larger than the prescribed thickness of the yokes and a width smaller than the prescribed width of the yokes to form a magnetic gap in the magnetic circuit.

The thickness of the magnetic pole is larger than the thickness of the yokes, and the width of the magnetic pole is smaller than the width of the yokes, whereby the magneto-resistance of the yokes is decreased, and at the same time, the aspect ratio of the magnetic pole can be increased.

The invention also relates to, as a further aspect, a magnetic head containing a magnetic recording element on a back end surface of a flying slider, the magnetic recording element containing a pair of yokes connected at back ends thereof to constitute a magnetic circuit; a coil wound on the magnetic circuit; and a magnetic pole embedded in a concave part formed at a tip end of at least one of the pair of yokes to form a magnetic gap in the magnetic circuit.

The magnetic pole is embedded in the concave part at the tip end of the yoke, and thus the magnetic pole can be prevented from protruding from the bottom surface of the magnetic head.

The invention also relates to, as a further aspect, a magnetic disk unit containing a magnetic head containing a magnetic recording element on a back end surface of a flying slider flying above a magnetic recording medium, the magnetic recording element containing an insulating film supporting a thin film coil; a pair of yoke films deposited on both sides of the insulating film and connected at back ends thereof; and a magnetic pole film attached to a tip end of at least one of the pair of yoke films, so as to form a magnetic gap.

The magnetic recording element of the magnetic head has a small magneto-resistance and generates a strong leakage magnetic field from the magnetic pole having minute width and length, and therefore, a magnetic disk unit attaining high speed recording and high density recording can be realized.

BRIEF DESCRIPTION OF THE DRAWINGS

FIGS. 1A to 1D relate to a magnetic head relating to a first embodiment of the invention, in which FIG. 1A is a schematic side cross sectional view showing the magnetic head, FIG. 1B is a side cross sectional view showing details of a magnetic recording transducer of the magnetic head, FIG. 1C is a view from the backside of a main part of the magnetic recording transducer, and FIG. 1D is a bottom plane view showing a magnetic pole of the magnetic head;

FIGS. 4A and 4B relate to a magneto-resistive sensor of a magnetic head relating to a second embodiment of the invention, in which FIG. 4A is a bottom plane view thereof, and FIG. 4B is a view from the backside thereof;

FIGS. 5A and 5B relate to a magnetic head relating to a third embodiment of the invention, in which FIG. 5A is a side cross sectional view showing details of a magnetic recording transducer thereof, and FIG. 5B is a bottom plane view showing a magnetic pole thereof;

FIGS. 7A to 7E relate to a conventional magnetic head, in which FIG. 7A is a schematic side cross sectional view showing the magnetic head, FIG. 7B is a side cross sectional view showing details of a magnetic recording transducer of the magnetic head, FIG. 7C is a view from the backside of a main part of the magnetic recording transducer, FIG. 7D is a bottom plane view showing a production process of a magnetic pole of the magnetic head, and FIG. 7E is a bottom plane view showing another production process of the magnetic pole.

DETAILED DESCRIPTION OF THE PREFERRED EMBODIMENTS

Figure 1A:
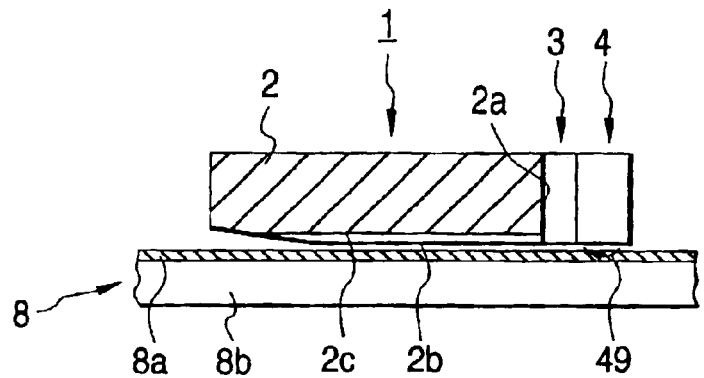

FIGS. 1A to 1D show a main part of a magnetic head relating to a first embodiment of the invention. As shown in FIG. 1A, a magnetic head 1 has a magneto-resistive sensor 3 and a magnetic recording transducer 4 consecutively piled on a back end surface 2a of a flying slider 2, and the head flies above a magnetic recording layer 8a formed on a substrate 8b of a magnetic disk 8 by a flying surface 2b having a concave part 2c of the flying slider 2. The head records information in the magnetic recording layer 8a with a magnetic field 49 leaked from the magnetic recording transducer 4, and reproduces information with the magneto-resistive sensor 3.

Figure 1B:
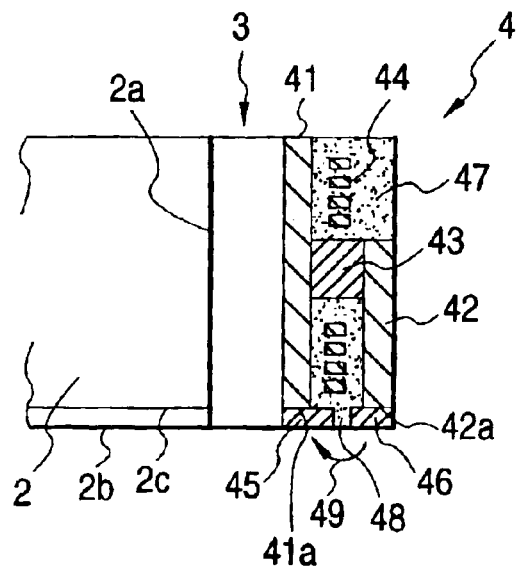
Figure 1C:
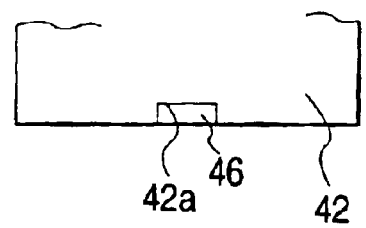
Figure 1D:
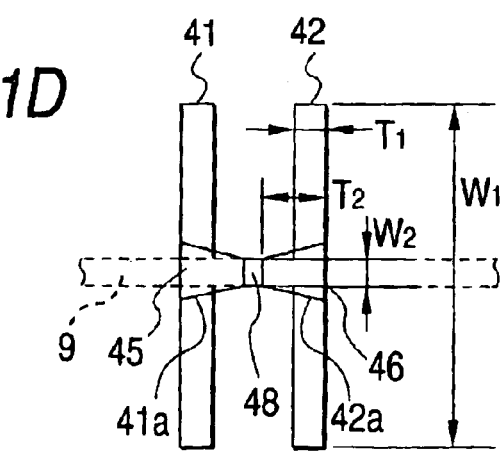

As shown in FIGS. 1B, 1C and 1D, the magnetic recording transducer 4 is formed in the following manner. A lower yoke 41 formed functioning as a magnetic shield film, a dielectric film 47 as an insulating film supporting a thin film coil 44, and an upper yoke 42 constituting a magnetic circuit by connecting at a back end of the lower yoke 41 through a connecting part 43 are consecutively deposited, and a lower magnetic pole 45 and an upper magnetic pole 46 are attached to concave parts 41a and 42a at tip ends of the lower yoke 41 and the upper yoke 42, so as to form a magnetic gap 48 between the lower magnetic pole 45 and the upper magnetic pole 46. The yokes 41 and 42, the connecting part 43 and the poles 45 and 46 are formed with a soft magnetic film, such as Permalloy.

As shown in FIG. 1D, the magnetic poles 45 and 46 are arranged in a direction along a recording track 9, and each is processed to have a trapezoidal shape having a narrowing tip end, which enables to make a strong magnetic field. The magnetic poles 45 and 46 have a thickness $T_2$ that is larger than the thickness $T_1$ of the yokes 41 and 42, and a width $W_2$ that is smaller than the width $W_1$ of the yokes 41 and 42. The thickness $T_2$ of the magnetic poles 45 and 46 is larger than the width $W_2$ thereof.

An example of a production process of the magnetic head 1 will be described. As a material of the flying slider 2, for example, altic ($Al_2O_3$—$TiO_2$), which is generally used as a magnetic head for a hard disk drive, is used. As the magneto-resistive sensor 3, for example, an ordinary GMR (giant magnetic sensor) is used. The plural magneto-resistive sensors 3 and the plural magnetic recording transducers 4 are deposited one-dimensionally or two-dimensionally on a wafer of attic by using a thin film process. As having been carried out in the ordinary production process of magnetic heads, a chip bar having the magneto-resistive sensors 3 and the magnetic recording transducers 4 arranged one-dimensionally is cut out, the flying surface 2b having the concave part 2c of the flying slider 2 is formed on a cross section thereof, followed by cutting into respective head chips. The magnetic poles 45 and 46 are produced by a thin film process. That is, in the phase of the chip bar, a soft magnetic film, such as Permalloy, for the magnetic poles 45 and 46 is attached to the flying surface 2b of the chip bar by sputtering or plating, and the soft magnetic film is ground by ion milling to work the magnetic poles 45 and 46 into a desired shape, whereby the magnetic gap 48 is formed. The magnetic gap 48 is formed to have a width of 100 nm or less, preferably from 20 to 30 nm. Thereafter, the magnetic gap 48 is filled with a dielectric film to make a flat bottom surface of the magnetic head 1. It is also possible that after etching the dielectric film by ion milling, a soft magnetic film is attached to the part that has been removed by etching to form the magnetic poles 45 and 46.

The operation of the magnetic head 1 will be described. The magnetic head 1 flies above the magnetic recording layer 8a formed on the substrate 8b of the magnetic disk 8 by the flying surface 2b having the concave part 2c of the flying slider 2. An electric current according to a recording signal is supplied to the thin film coil 44 of the magnetic recording transducer 4 to generate the magnetic field 49 in proportion to the electric current at the magnetic gap 48, and recording on the magnetic recording film 8a is carried out by the modulation of the magnetic field 49. Reproduction of the signal is carried out by detecting the strength change of the magnetic field from the magnetic recording layer 8a as the resistance change of a spin valve film of the magneto-resistive sensor 3.

The following effects can be obtained by the first embodiment.

(a) The shape of the surfaces of the magnetic poles 45 and 46 facing a magnetic recording layer 8a are determined by the working pattern of the thin film, and therefore, the magnetic poles 45 and 46 having a high aspect ratio (a ratio of the length in a direction of a recording track and the width in a direction perpendicular to the recording track) can be produced. As a result, a high recording density can be attained without occurrence of magnetic saturation.

(b) The width and the length of the magnetic gap 48 is independent from the width and the length of the yokes of the magnetic circuit, and thus the widths and the distance of the two yokes 41 and 42 can be increased. Therefore, the magneto-resistance can be reduced, and the thickness of the dielectric film 47 inserted between the yokes 41 and 42 can be increased, whereby yokes of high reliability can be formed.

(c) The bottoms of the magnetic poles 45 and 46 can be thickened, and the widths of the yokes 41 and 42 can be widened, whereby the magneto-resistance of the magnetic circuit can be reduced. Therefore, high speed modulation of the magnetic field is realized to attain high speed recording.

Figure 2A:
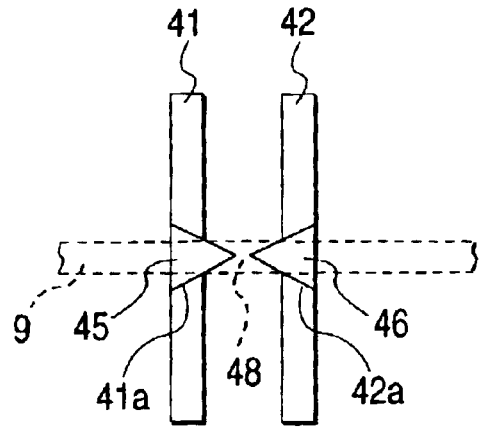
FIGS. 2A to 2E show modified examples of the magnetic pole of the magnetic head of the first embodiment of the invention.
Figure 2B:
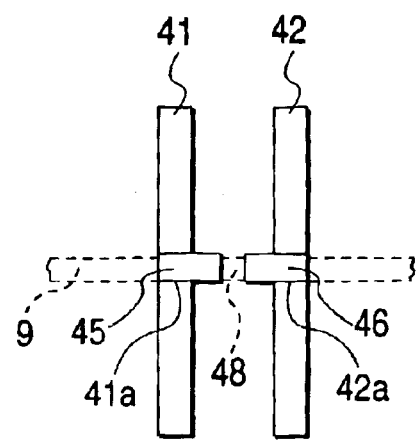
Figure 2C:
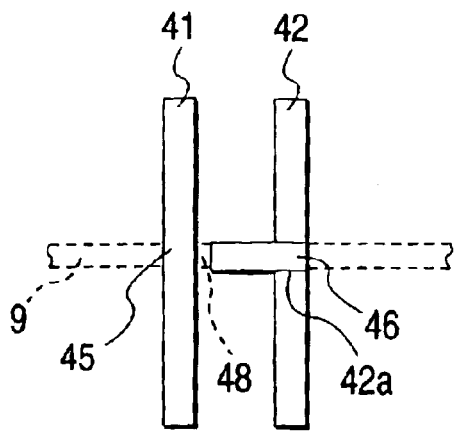
Figure 2D:
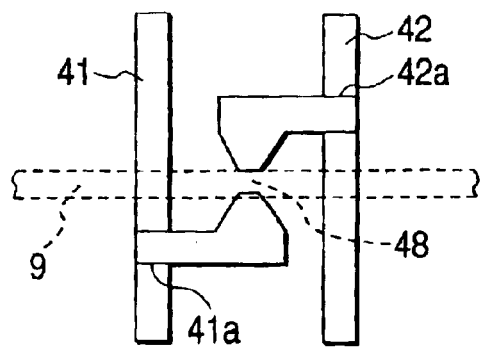
Figure 2E:
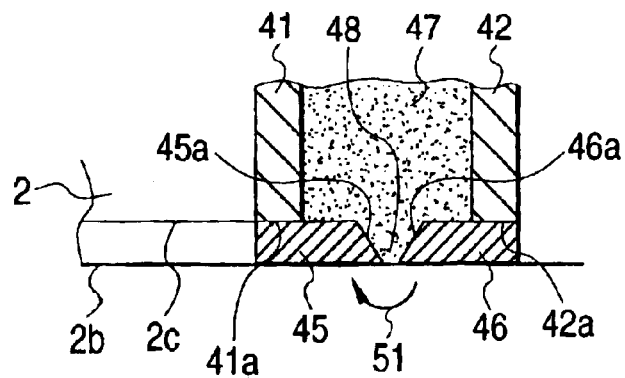

FIGS. 2A to 2E show modified examples of the magnetic poles 45 and 46. FIG. 2A shows an example, in which the tip ends of the magnetic poles 45 and 46 are formed to have a triangular shape. According to the example, the width of the magnetic gap 48 can be minimized. FIG. 2B shows an example, in which the tip ends of the magnetic poles 45 and 46 are formed to have a rectangular shape. According to the example, the processing thereof becomes convenient, and the leakage magnetic field in the transversal direction is suppressed to provide such an advantage that the track width can be reduced. Furthermore, the accuracy of the gap position can be improved upon etching for forming the magnetic gap 48. FIG. 2C shows an example, in which the magnetic pole 46 is attached to only one yoke 42, and the tip end of the other yoke 41 is formed as the magnetic pole 45. According to the example, the processability can be further improved. FIG. 2D shows an embodiment, in which the direction of the magnetic poles 45 and 46 and the magnetic gap 48 is rotated by 90° with respect to the recording track 9. According to the example, recording with magnetization in a direction perpendicular to the recording track 9 can be carried out. FIG. 2E is an enlarged cross sectional view showing the magnetic recording transducer 4 showing an embodiment, in which the tip ends of the magnetic poles 45 and 46 have slanted surfaces 45a and 46a to make the thickness thereof decreasing toward the tip ends. This example can be produced in such a manner that after processing the dielectric film 47 by ion milling, the magnetic poles 45 and 46 are attached. According to the example, the leakage magnetic field of the magnetic gap 48 can be concentrated at the tip ends, and thus the intensity of the leakage magnetic field incident on the magnetic recording layer 8a can be increased. Furthermore, because the thickness of the magnetic poles 45 and 46 can be decreased, plural magnetic poles 45 and 46 can be arranged at a high density, and thus parallel recording can be carried out.

Figure 3:
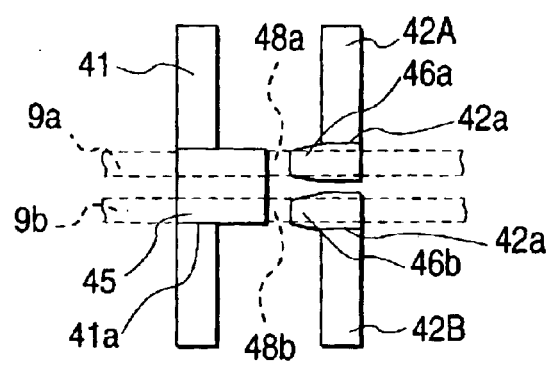
FIG. 3 is a bottom plane view showing a magnetic pole of a magnetic head relating to a second embodiment of the invention.

FIG. 3 shows a main part of a magnetic head according to a second embodiment of the invention. The magnetic head has plural magnetic gaps 48a and 48b, which are formed with two magnetic poles 46a and 46b facing the magnetic pole 45, wherein one magnetic pole 45 is commonly used. Two thin film coils (not shown in the figure) are formed between a yoke 41 and yokes 42a and 42b, and the coils can drive respective magnetic circuits independently from each other. Two magneto-resistive sensors are formed at positions corresponding to the magnetic gaps 48a and 48b.

Figure 4A:
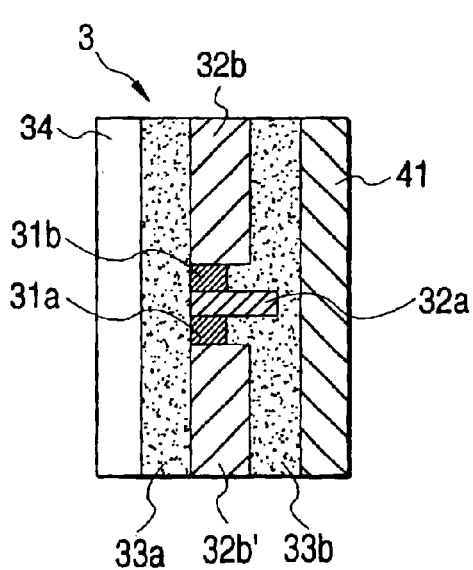
Figure 4B:
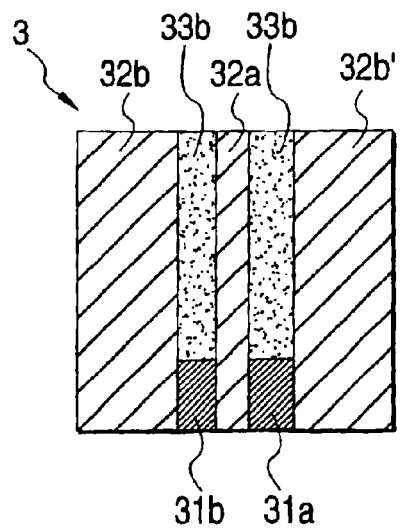

FIGS. 4A and 4B show two magneto-resistive sensors in the second embodiment. In the magneto-resistive sensor, the spin valve films 31a and 31b are separated into two by an electrode 32a, and signal detection can be carried out independently from each other from electrodes 32b and 32b' on both ends. In the figure, numeral 34 denotes a magnetic shield film, and 33a and 33b denote insulating films. According to the structure, the plural magnetic gaps 48a and 48b and the magneto-resistive sensors 3 can be formed without additional process steps, and the recording and reproduction speed can be increased twice by this example.

Figure 5A:
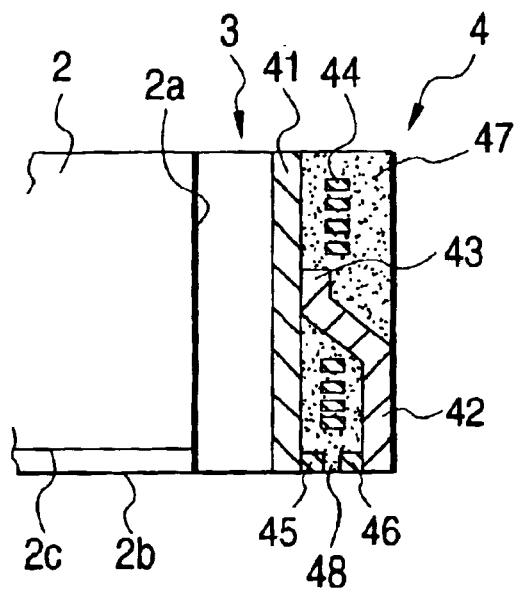
Figure 5B:
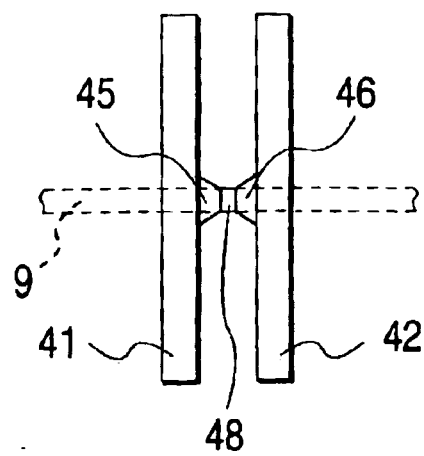

FIGS. 5A and 5B show a main part of a magnetic head according to a third embodiment of the invention. The magnetic head has magnetic poles 45 and 46 attached to inner surfaces of tip ends of a lower yoke 41 and an upper yoke 42, in which the upper yoke 42 and a connecting part 43 are formed as one unit. The same effects as in the first embodiment can be obtained in the third embodiment.

Figure 6:
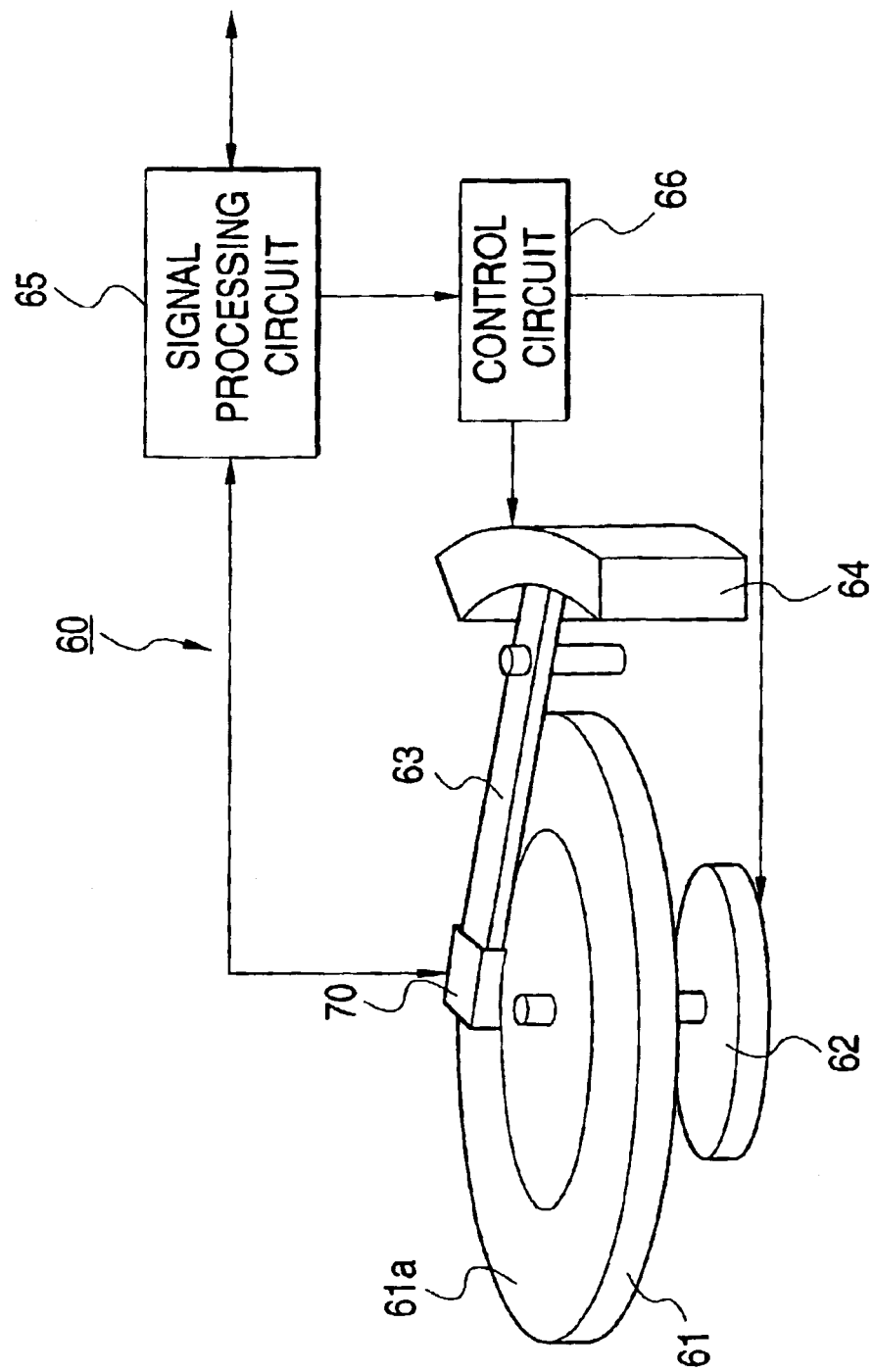
FIG. 6 is a schematic perspective view showing a magnetic disk unit relating to a fourth embodiment of the invention.
Figure 7A:
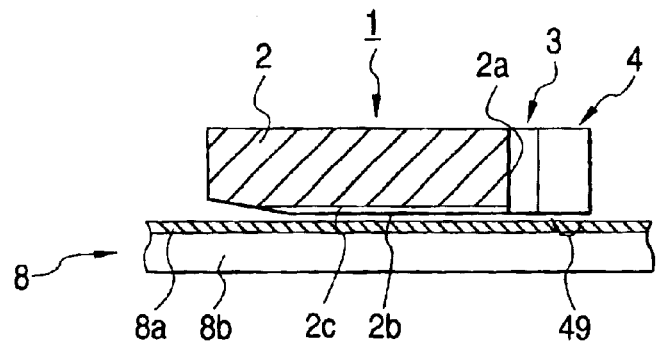
Figure 7B:
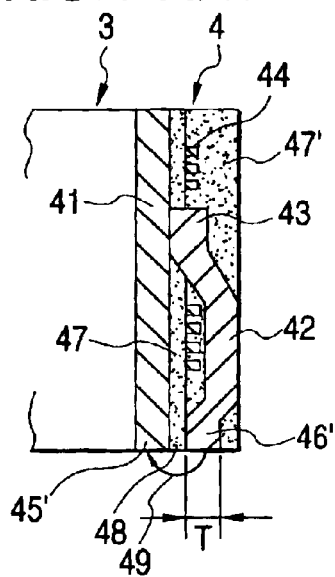
Figure 7C:
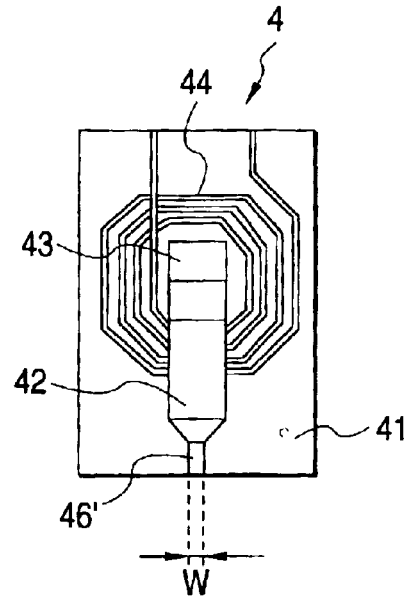
Figure 7D:
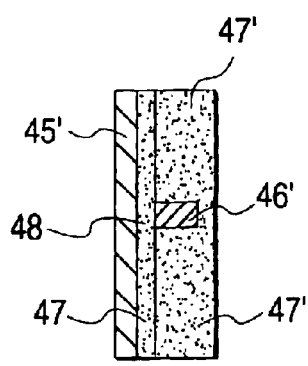
Figure 7E:
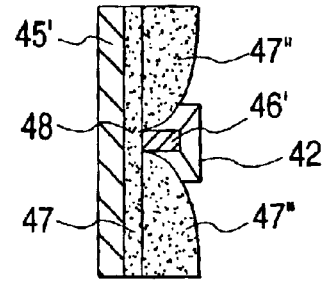

FIG. 6 shows a magnetic disk unit according to a fourth embodiment of the invention. The magnetic disk unit 60 has a magnetic disk 61 having a perpendicular magnetic recording medium formed with Pt/Cr as a magnetic recording layer 61a, a motor 62 rotating the magnetic disk 61, a magnetic head 70 according to the first or third embodiment flying above the magnetic recording layer 61a to carry out recording and reproduction on the magnetic recording layer 61a, a swing arm supporting the magnetic head 70, a voice coil motor 64 scanning the swing arm 63, a signal processing circuit 65 processing a recording signal to modulate the magnetic recording transducer 4 upon recording and reproducing recorded information by using a magnetic intensity signal from the magneto-resistive sensor 3 upon reproduction, and a control circuit 66 controlling the motor 62 and the voice coil motor 64 upon recording and reproduction.

According to the constitution, upon recording, a magnetic field 49 having been subjected to intensity modulation corresponding to the input signal is leaked from the magnetic recording transducer 4 and is incident on the magnetic recording layer 61a positioned immediately thereunder to record the information in the magnetic recording layer 61a. Upon recording and reproduction, the magnetic head 70 is moved to a specific recording track (not shown in the figure) on the magnetic recording layer 61a, and is tracked thereon based on the detected signal of the magneto-resistive sensor 3. These operations are carried out by positional control with the voice coil motor 64. That is, address information of the magnetic disk 61 is read out, and the voice coil motor 64 is driven by a driving signal based on the read information, whereby the magnetic head 70 is moved to the vicinity of the prescribed recording track. The magnetic head 70 is then precisely tracked on the prescribed recording track by driving of the voice coil motor 64. Owing to the small size and the lightness of the magnetic head 70, the precise tracking can be also realized by driving the entire magnetic head 70 with a piezoelectric element (not shown in the figure).

According to the fourth embodiment, such a magnetic recording transducer 4 can be used that has a low magneto-resistance and a strong leakage magnetic field with minute width and length, and therefore, a magnetic disk unit with high recording and reproduction speed and a high recording density can be provided.

The thin film coil may be wound on an axis along a direction perpendicular to the sliding direction of the flying slider. Furthermore, a magnetic recording transducer may be deposited on the back end surface of the flying slider, and a magneto-resistive sensor is deposited further thereon.

As described in the foregoing, according to the invention, because the shape of the surface of the magnetic pole facing the magnetic recording medium is determined by the working pattern of the thin film, a magnetic pole having a high aspect ratio can be formed, and a magnetic head can be produced by a relatively inexpensive production process, whereby high speed and high density recording can be attained. Furthermore, because the width and the length of the magnetic gap are independent from those of the yoke of the magnetic circuit, the width and the distance of the two yokes can be increased. Therefore, the magneto-resistance can be reduced, and the thickness of the insulating film inserted between the yokes can be increased, whereby yokes of high reliability can be formed.

The entire disclosure of Japanese Patent Application No. 2002-10102 filed on Jan. 18, 2002 including specification, claims, drawings and abstract is incorporated herein by reference in its entirety.

What is claimed is:

1. A magnetic head comprising a magnetic recording element on a back end surface of a flying slider, the magnetic recording element, comprising:

an insulating film supporting a thin film coil;

a pair of yoke films each having a front end and a back end, the pair of yoke films on both sides of the insulating film and connected at their respective back ends, at least one of the pair of yokes having a concave part formed at a tip end of the yoke; and a magnetic pole film deposited at the tip end of at least one of the pair of yoke films to form a magnetic gap the magnetic gap filled with insulating film and between the pair of yoke films.

2. A magnetic head comprising a magnetic recording element on a back end surface of a flying slider, the magnetic recording element, comprising:

a pair of yokes each having a front end and a back end, the pair of yokes connected at their respective back ends to constitute a magnetic circuit, at least one of the pair of yokes having a concave part formed at a tip end of the yoke;

a coil wound on the magnetic circuit; and a pair of magnetic poles provided at the tip ends of the pair of yokes and protruding from outer edges of the magnetic recording element toward the inside of the magnetic recording element to form a magnetic gap in the magnetic circuit.

3. A magnetic head comprising a magnetic recording element on a back end surface of a flying slider, the magnetic recording element comprising:

a pair of yokes each having a front end and a back end, the pair of yokes connected at their respective back ends to constitute a magnetic circuit, at least one of the pair of yokes having a concave part formed at a tip end of the yoke;

a coil wound on the magnetic circuit; and a magnetic pole provided at the tip end of at least one of the pair of yokes and having a thickness larger than a thickness of the yokes and a width smaller than a width of the yokes to form a magnetic gap in the magnetic circuit.

4. A magnetic head comprising a magnetic recording element on a back end surface of a flying slider, the magnetic recording element comprising:

a pair of yokes each having a front end and a back end, the pair of yokes connected at their respective back ends to constitute a magnetic circuit, at least one of the pair of yokes having a concave part formed at a tip end of the yoke;

a coil wound on the magnetic circuit; and a magnetic pole embedded in the concave part formed at the tip end of at least one of the pair of yokes to form a magnetic gap in the magnetic circuit.

5. A magnetic disk unit comprising a magnetic head comprising a magnetic recording element on a back end surface of a flying slider flying above a magnetic recording medium, the magnetic recording element comprising:

an insulating film supporting a thin film coil;

a pair of yoke films each having a front end and a back end, the pair of yokes on both sides of the insulating film and connected at their respective back ends, at least on of the pair of yokes having a concave part formed at a tip end of the yoke; and a magnetic pole film deposited at the tip end of at least one of the pair of yoke, so as to form a magnetic gap the magnetic gap filled with insulating film and between the pair of yoke films.

* * * * *